United States Patent

[11] 3,578,843

| [72] | Inventor | George Augustus Castellion<br>Stamford, Conn. |
|---|---|---|
| [21] | Appl. No. | 773,690 |
| [22] | Filed | Sept. 25, 1968 |
| [45] | Patented | May 18, 1971 |
| [73] | Assignee | American Cyanamid Company<br>Stamford, Conn. |

[54] CONTROL OF LIGHT REFLECTED FROM A MIRROR
7 Claims, 4 Drawing Figs.

| [52] | U.S. Cl. | 350/160,<br>350/290 |
|---|---|---|
| [51] | Int. Cl. | G02f 1/28 |
| [50] | Field of Search | 350/160 |

[56] References Cited
UNITED STATES PATENTS
3,453,038  7/1969  Kissa et al.................... 350/160
3,462,712  8/1969  Boddy et al.................. 350/160X

*Primary Examiner*—Ronald L. Wibert
*Assistant Examiner*—Paul K. Godwin
*Attorney*—Charles J. Fickey ABSTRACT: Electro-optical device useful in modulation of reflected light, and the like, typically comprising an electrochromic device and a reflecting layer in sandwiched arrangement, said electrochromic device itself being a sandwich arrangement of a pair of transparent electrodes, and a film of a transition metal compound and an insulating film disposed between the electrodes. The electrochromic device exhibits coloration and bleaching thereof at ambient temperature by control of the polarity of an applied electric field, whereby light reaching the reflecting layer is modulated in intensity, thus modulating, in turn, the reflected light.

PATENTED MAY 18 1971 3,578,843

INVENTOR.
GEORGE AUGUSTUS CASTELLION
BY
Charles J. Vickey
ATTORNEY

CONTROL OF LIGHT REFLECTED FROM A MIRROR

This invention relates to electro-optical devices and more particularly to devices whose electromagnetic radiation transmission characteristics may be selectively altered by the influence of a suitable controlled electric field.

In copending, commonly assigned U.S. application Ser. No. 622,822, filed Feb. 7, 1967, there are described electro-optical devices exhibiting a phenomenon known as "persistent electrochromism." This term denotes the property of a material whereby its electromagnetic radiation absorption characteristic is altered, in most instances even at ambient temperature, under the influence of an electric field. Such materials, for example, may exhibit little or no absorption of visible wavelengths in the absence of an electric field and therefore be transparent, but when subjected to an electric field, effectively absorb in the red end of the spectrum, turning blue in color. Similar effects can be observed in other portions of the electromagnetic radiation spectrum, invisible as well as visible.

As described in the foregoing earlier applications, if a layer of a persistent electrochromic material is disposed between a pair of electrodes, across which a potential is applied, the radiation transmitting characteristic of the material will change. If the electrodes and the electrochromic layer are formed on the surface of a transparent substrate, such as glass, the light transmitting characteristics of the combination can be varied by controlling the electric field produced across the electrochromic layer. Thus, if the "sandwich" of electrodes and electrochromic material on the substrate originally is clear, i.e. presenting substantially no diminution of the light transmitting ability of the substrate, application of a voltage between the electrodes to establish an electric field of the proper polarity changes the light absorption characteristic of the electrochromic material, turning it darker for example, thus decreasing the light transmitting ability of the entire assembly.

An additional layer is placed between one of the electrodes and the electrochromic material, the additional layer being of a material which can be characterized as a current carrier permeable insulator. It has been found that when such a material is added to the prior device, not only does it permit the absorption characteristic of the electrochromic material to change rapidly under the influence of an electric field of a given polarity, even at ambient temperature, but it also renders the electrochromic layer sensitive to a field of the opposite polarity to return it positively to the absorption characteristic state it occupied prior to the initial application of the field, at a rate dependent upon the magnitude of the reverse field. In certain cases, the return to initial state may be effected at a relatively slow rate simply by providing a highly conductive, e.g., short circuit, path between the two electrodes.

The prior device had utility as a device for controlling transmitted light, that is light passing through the device. Thus the device would serve as an additional element in an optical system incorporating reflection elements.

It is an object of this invention to provide a reflecting device for modulating reflected light.

Another object is to provide a light reflecting device having electro-optical light modulating means.

A further object is to provide a light reflecting device having infinitely variable light modulation ability.

The device of the invention comprises in sandwich arrangement, a first transparent electrode, a current carrier permeable insulator, a persistent electrochromic layer, a second electrode, a transparent support, and a reflecting layer. When the device is placed in an electric circuit with the first electrode positive and the second negative, the electrochromic layer will color, thus the amount of light reaching the reflecting surface from the side of the first electrode and being reflected back will be reduced. Reversing the circuit polarity will cause the electrochromic layer to bleach to the colorless state, thus increasing the reflected light from the reflecting surface to the normal intensity.

The foregoing and other features, objects and advantages of the present invention will become more apparent from the following detailed description thereof taken in conjunction with the accompanying drawings in which.

Figure 1:
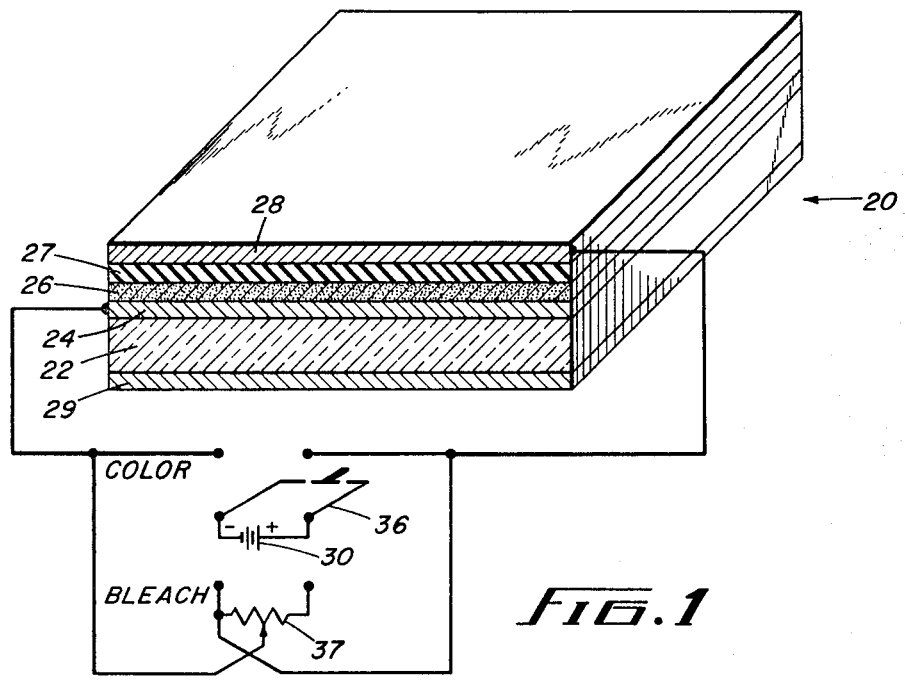
FIG. 1 is an illustration, partly in cross section, of an electro-optical device of the present invention, type described and claimed in the foregoing earlier applications.

In the discussion above, as well as that to follow the invention, is described in terms of its effect on visible light transmission characteristics, i.e., the variation in the wavelength absorption of the electrochromic material within the visible region of the spectrum. It will, of course, be recognized that the phenomenon exhibited by the type of materials to be described is not limited to the visible spectrum but may extended into the invisible regions.

ELECTROCHROMIC MATERIALS

As used herein, a "persistent electrochromic material" is defined as a material responsive to the application of an electric field of a given polarity to change from a first persistent state in which it is essentially nonabsorptive of electromagnetic radiation in a given wavelength region to a second persistent state in which it is absorptive of electromagnetic radiation in the given wavelength region, and once in said second state, responsive to the application of an electric field of the opposite polarity to return to its first state. Certain of such materials can also be responsive to a short circuiting condition, in the absence of an electric field, so as to return to the initial state.

By "persistent" is meant the ability of the material to remain in the absorptive state to which it is changed, after removal of the electric field, as distinguished from a substantially instantaneous reversion to the initial state, as in the case of the Franz-Keldysh effect.

The materials which form the electrochromic materials of the device in general are electrical insulators or semiconductors. Thus are excluded those metals, metal alloys, and other metal-containing compounds which are relatively good electrical conductors.

While not wholly understood, it appears that the materials contain in nonstoichiometric proportions at least two different elements, said elements being present as ions of opposite polarity. This condition produces lattice defects as distinguished from mere physical displacement of crystal symmetry, although the condition may also result in or be evidenced by such. Lattice vacancies are particular instances of lattice defects as, for example, an oxygen vacancy in a metal oxide crystal.

Two classes of electrochromic materials may be distinguished which satisfy the foregoing conditions and are therefore useful in the present invention. The first and preferred class (I) comprises materials disclosed in the above-mentioned prior patent applications. These materials exhibit persistent electrochromism over a wide temperature range including ambient temperature and in some instances high temperatures, e.g., above about 125° C. or low temperatures, e.g., below about −50° C. By "ambient temperature" is meant temperatures normally encountered in the fields of use of the devices such as described hereinafter, e.g., −50°C to 125°C.

The second class (II), comprises materials which exhibit persistent electrochromism only at relatively high (nonambient) temperature, e.g., above about 125° C. Examples of these materials are gross crystals or crystalline layers or films of alkali halides such as NaCl, RbCl, KCl, LiF, NaBr, KBr, KI, RbBr, and the like, as described in British Pat. No. 845,053 and corresponding West German Pat. 1,036,388. Combinations of class (I) and class (II) materials may also be employed.

The class (I) materials are further characterized as inorganic substances which are solid under the conditions of use, whether as pure elements, alloys, or chemical compounds, containing at least one element of variable oxidation state, that is, at least one element of the Periodic System which can exist in more than one oxidation state in addition to zero. The term "oxidation state" as employed herein is defined in "Inorganic Chemistry," T. Moeller, John Wiley & Sons, Inc., New York, 1952. These include materials containing a transition metal element (including Lanthanide and Actinide series elements); materials containing nonalkali metal elements such as copper, tin and barium; and materials containing an alkali metal element with a variable oxidation state element. Preferred materials of this class are films of transition metal compounds in which the transition metal may exist in any oxidation state from +2 to +8. Examples of these are: transition metal oxides, transition metal sulfides, transition metal oxysulfides, transition metal halides, selenides, tellurides, chromates, molybdates, tungstates, vanadates, niobates, tantalates, titanates, stannates, and the like. Particularly preferred are films of metal stannates, oxides and sulfides of the metals of Groups IVB, VB and VIB of the Periodic System, and Lanthanide series metal oxides and sulfides. Examples of such are copper stannate, tungsten oxide, molybdenum oxide, titanium oxide, vanadium oxide, niobium oxide, cerium oxide, cobalt tungstate, metal molybdates, metal titanates, metal niobates, and the like.

The class (I) electrochromic materials are distinguished from prior known organic or inorganic materials which exhibit coloration in an electric field as a result of the Franz-Keldysh effect or the effect Platt describes as "electrochromism." As to Platt, see J. Chem. Phys. 34, 862—3 (1961). In the latter cases, coloration results from the shifting of an existing absorption band or spectral line by the electric field; whereas in the present invention, upon coloration, an absorption band is created where none existed before, or removed bleaching.

An important advantage of devices of the invention containing a class (I) persistent electrochromic material is operability at ambient temperature. So far as is known, this is the first instance of electrochromic behavior at temperatures of practical application. The invention, therefore, permits numerous practical applications to which prior art electro-optical devices are not susceptible as will be evident from the ensuing description.

When the persistent electrochromic materials are employed as films, thickness desirably will be in the range of from about 0.1—100 microns. However, since a small potential will provide an enormous field strength across very thin films, the latter, i.e., 0.1—10 microns, are preferred over thicker ones. Optimum thickness will also be determined by the nature of the particular compounds being laid down as films and by the film-forming method since the particular compound and film-forming method may place physical (e.g., nonuniform film surface) and economic limitations on manufacture of the devices.

The films may be self-supporting, depending on thickness and film material, or may be laid down on any substrate which, relative to the film, is electrically nonconducting. Suitable substrate materials include glass, wood, paper, plastics, and the like, including transparent, translucent, opaque or other optical quality materials.

The preferred electrochromic material for use with the insulating layer is a class (I) material as defined above. However, the performance of class (II) electrochromic materials is also improved since the electrochromic material is made polarity sensitive thereby, that is, responsive to a field of one polarity but not to both at the same time as in the prior art device of British Patent 845,053.

Turning now to the drawings, FIG. 1 illustrates a device 20 in accordance with the invention. On a substrate 22 such as glass or other transparent material, are successively deposited layers of a conductive material 24, a persistent electrochromic material 26, an insulating material 27 and a second conductive material 28, and a reflecting layer 29 on the opposite side of substrate 22. The conductive materials are of optical quality effective for passing light to reflecting layer 29. The substrate 22 and the conductive layer 24 may conveniently be provided as a unit by so-called "NESA" glass, a commercially available product having a transparent coating of conductive tin oxide on one surface of a glass sheet. The layers 26 and 28 may then be deposited on the tin oxide layer known vacuum deposition techniques. The persistent electrochromic material may be tungsten oxide or molybdenum oxide, for example the outer electrode 28 may be a gold film. A source of DC potential 30 is coupled between the conductive films with its positive terminal on the tin oxide layer and its negative terminal on the gold outer layer.

INSULATING LAYER

The insulating layer 27 may be defined as a "current carrier permeable insulator" and as used herein is intended to denote any material of electrical resistivity sufficient to provide continuous effective insulation against normal electrical conduction between opposed surfaces of the electrodes. Numerous well-known materials are suitable for use as current carrier permeable insulators in this invention. These include an air gap or vacuum gap; normally substantially nonconductive substances such as plastics, e.g., polyesters, vinyl or like polymers, allylic or like polymers, polycarbonates, phenolics, amino resins, polyamides, polyinides, cellulosic resins, and others whether solvent or water soluble or insoluble. Also included are metal oxides or sulfides prepared by oxidizing or sulfidizing a metal electrode surface such that the insulator is formed directly on the electrode. An example is the combination of an aluminum electrode and aluminum oxide insulator coating. Other such inorganic insulators contemplated are selenide, arsenide, nitride, chloride, fluoride, bromide and carbide films.

Where practicable and compatible with the electromagnetic material and electrodes, the insulator may be a fluid (liquid or gas), low melting solid, or solid or liquid mixture of two or more different insulating materials.

Three suitable insulators are silicon oxide, calcium fluoride and magnesium fluoride.

Preferably the insulator is a film of at least about 0.001 microns thickness, for example, in the range of about 0.001-—1.0 microns.

The normal stoichiometric relationship in the compounds which serve as persistent electrochromic materials or as insulators has not been indicated herein, e.g., tungsten dioxide rather than tungsten oxide or silicon monoxide rather than silicon oxide, since the materials are intended to include not only compounds in which stoichiometry obtains but also compounds in which the relationship of atoms of the elements is not precisely stoichiometric, it being understood that the materials are more precisely defined by the characteristics herein described.

The mechanism by which the current carrier permeable insulator improves the performance of the persistent electrochromic material can be understood as a selective introduction of charge carriers (i.e., electrons, holes, positive or negative ions) suitable for the subsequent production of persistent coloration in the electrochromic material. The current carrier permeable insulator thereby renders the electrochromic material polarity sensitive, with the result that application of a voltage of polarity opposite that which produces coloration will result in bleaching without simultaneous recoloration.

This general mechanism may be viewed more particularly as two cases or theories, electronic and ionic. Each case explains certain observations not adequately explained by the other case, and it is not altogether implausible that the mechanisms may operate simultaneously although independently.

In a first or electronic case, the current carrier permeable insulator functions by nonclassical transposition (tunneling) of electrons or holes through the energy barrier junction between the insulator and the persistent electrochromic material. An equivalent characterization of such insulator materials in this view is that they exhibit an energy gap between their valence and conduction bands of width sufficient at the temperature of use to impede normal electrical conduction through the material of the insulator but nevertheless, because of their thinness, permit quantum mechanical tunneling of current carriers, i.e., electrons or holes. The current carriers which are injected by the tunneling process through the insulator into the persistent electrochromic material possess sufficient energy to become trapped in the energy level sites which produce the color centers observed as the coloration of the persistent electrochromic material. In order to maintain approximate charge neutrality in the persistent electrochromic layer, carriers of sign opposite to that of carriers which tunnel through the insulating layer must enter from the electrode opposite the electrode adjacent the insulating layer. During bleaching, either by short-circuiting or by imposition of a voltage opposite that of the voltage which produces coloration, the charge carriers are removed or permitted to recombine through the external circuit, emptying the carriers from their traps and thus restoring the color centers to their original colorless condition. Coloration cannot occur under the condition of reverse voltage because the current carrier permeable insulator is not adjacent the electrode of polarity suitable for the tunneling and injection phenomenon.

Alternatively, as a second case, the current carrier permeable insulator can serve to block entirely the passage of an electronic current (i.e., electrons or holes) but permit the transfer through it of ions. In such case, the insulator serves to facilitate the production of color centers in the persistent electrochromic layer by providing a large electric field gradient through which ions may move rapidly, even at ambient temperature, to be removed or added to the persistent electrochromic material. In this situation, the insulator layer can also serve as a temporary or permanent repository for ions removed from the electrochromic layer.

Whether or not these theories are ultimately proven to govern in the present invention, the devices described herein achieve the coloration and bleaching capabilities indicated.

The reflective layer 29 is applied to the opposite side of substrate 22 and may be any known material which will reflect light such as silver, aluminum, mercury alloys and the like, which are widely used for mirror surfaces.

As indicated above, the device functions effectively in a reversible manner. For this purpose, the battery 30 is coupled to the electrodes 24 and 28 through a reversing switch indicated generally at 36. As shown, with the switch arm in the position to produce coloration, the positive terminal of the source is connected to the outer or gold electrode while the negative terminal is connected to the tin oxide layer on the glass substrate.

Once complete coloration is induced, which in a typical case is a matter of seconds, the switch 36 may be opened, disconnecting the battery from the device entirely, and the device will remain in its darkened state without further application of power.

To bleach or erase a previously darkened surface, the switch arm is thrown to the "bleach" contacts, across which is connected a potentiometer 37. As shown, the potentiometer contact or slider is movable from a point at which the electrodes 24 and 28 are short circuited to a point at which full battery voltage, of polarity opposite to the coloration condition, is applied between them. Any number of reverse voltage values may be obtained between the two extremes.

In the position illustrated in the drawing, a "bleach" voltage of a value less than battery voltage is applied across the electrodes, setting up a corresponding electric field. Under the influence of this field, the device returns to its initial uncolored state. The rapidity with which the bleaching occurs is determined by the magnitude of the voltage; the higher the voltage; the faster the bleaching process is completed. At the higher bleaching voltages, it has been found that the bleaching process is even faster than the coloring operation. Once the bleaching is completed, no further coloration is observed with this polarity and the switch may be opened to disconnect the battery from the device and minimize power drain.

It has also been found that, notwithstanding the absence of an electric field, when the potentiometer is in its short circuiting position, certain of the persistent electrochromic materials nevertheless will return completely and positively to the initial state. The rate at which the bleaching occurs, however, is somewhat slower than when the material is subjected to an electric field.

Figures 2, 3, 4:
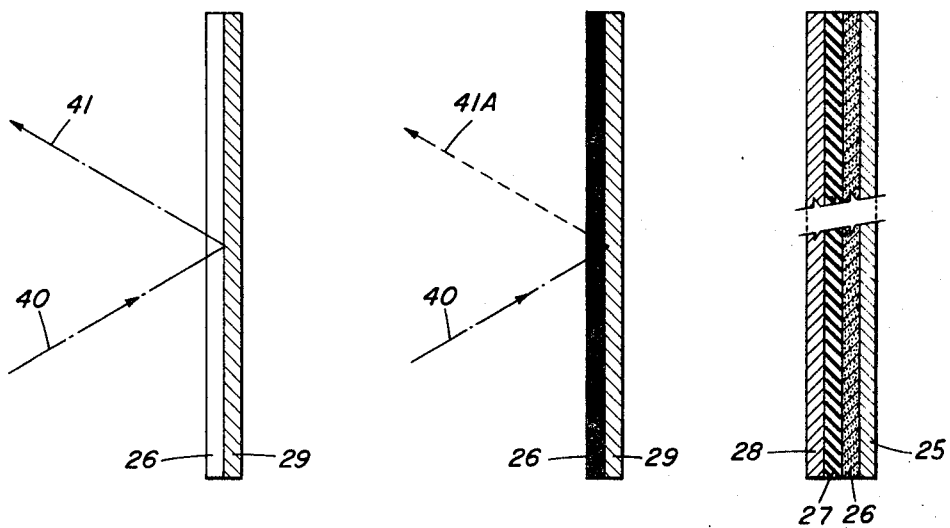
FIGS. 2 and 3 are diagrammatic illustrations of the inventive device in the modulation of reflected radiation.
FIG. 4 illustrates, in partial cross section, an alternative device according to the invention.

Thus, the device of FIG. 1 functions as a self-contained modulator for reflected light. As shown in FIG. 2, a light ray 40 is reflected as a substantially full intensity ray 42 when the device 20 is in a bleached state. When the device is colored, as shown in FIG. 3, the amount of light from ray 40 passing through the colored electrochromic layer 26 to the reflecting layer 29 and from the reflecting layer is less due to absorption. Thus the reflected ray 41A, is lower in intensity. The difference in intensity may be varied as desired by controlling the density of coloration of electrochromic layer 26. The coloration is a function of the time that the current is applied, up to a certain maximum coloration. Thus if the current is applied for any time interval less than that required to obtain maximum coloration, a lesser amount of coloration will be obtained which will absorb less light, giving more reflected light. The amount of reflected light may thus be varied from the total, to any amount down to the minimum allowed.

Moreover, when the coloration current is cut off, the state of coloration reached at that point persists and does not require constant application of current to be maintained.

ELECTRODES

Virtually any material exhibiting electrical conductivity may be used for an electrode. The same material may be used for both electrodes or each electrode may be of a different material, or mixture or alloys of different materials. Typical electrode materials are the metals, e.g., gold, silver, aluminum, and conducting nonmetals such as carbon, suitable doped tin or indium oxide, and the like. As already indicated, at at least one of the electrodes should be of an optical quality effective for transmission of the electrochromic change, if in the visible, or for instrumentally sensing the change, if not in the visible range.

The negative and positive electrodes need only be in electrical contact with the film. Any type and arrangement of electrodes and film effective to impose an electric field on the film when the electrodes are connected to a voltage source, will be suitable. Thus, the electrodes may be spaced conducting strips deposited on or imbedded in the film, or they may be conducting layers between which the film is inserted.

As will be apparent from the specific examples to be described below, many combinations of persistent electrochromic materials, insulating materials and electrode materials may be employed in accordance with the present invention. While the following examples describe devices incorporating class (I) electrochromic materials, it should be understood that where high temperature use is contemplated, class (II) electrochromic materials may be employed.

Example 1

A film of molybdenum oxide, about 1.0 micron in thickness, is thermally evaporated by conventional means at a pressure of $10^{15}$ Torr. from an electrically heated tantalum boat onto the tin oxide coated side of "NESA" glass, the tin oxide on the glass forming the first electrode. A layer of silver was deposited on the opposite layer of the "NESA" glass. A very thin film of silicon oxide (about 200 angstroms thick) an insulating material, is then deposited in like manner onto the molybdenum oxide layer. Finally, a thin film of gold (about 100 angstroms thick) effectively transparent, is deposited over the silicon oxide insulating layer to form the second electrode of the layered structure or sandwich.

During the several stages of evaporation, appropriate masking is effected to expose a portion of the tin oxide layer for attachment of the conductor, and also to extend the gold layer so that a portion of it is directly on an uncoated portion of the glass substrate, minimizing the danger of shorting through to the tin oxide layer when the conductor is attached to the gold electrode. Attachment of the electrode leads is facilitated by first painting the desired electrode area with a conductive silver paint and, after the paint has dried, attaching the wires with indium solder.

When an electric field of from 5 to 7 volts is applied across the foregoing sandwich structure with the gold layer as the positive electrode and the tin oxide as the negative electrode, the molybdenum oxide film, normally colorless, is colored blue uniformly over the entire surface, reducing the reflected light transmission of the device to about 10 percent in 30 seconds. The coloration remains substantially permanent when the electric field is removed.

When an electric field of reverse polarity is applied, i.e., positive potential on the tin oxide layer and negative potential on the gold layer, the coloration fades uniformly and completely to restore the initial reflected light transmission of the sandwich. This occurs somewhat faster than the coloration, taking about 6 to 15 seconds, but can be varied by changing the value of potential.

Example 2

The device is fabricated as described in connection with Example 1 except that a film of tungsten oxide is substituted for the molybdenum oxide. Application of 2 to 3 volts between the electrodes, with the gold electrode positive, reduces the reflected light transmission of the device to 4 percent in about 2 minutes, Reversal of the polarity for approximately 15 seconds restores the full light transmission capability. It has been found that with the tungsten oxide film, bleaching also occurs, but more slowly, when the electrodes are short circuited. A very gradual, i.e., over a span of several hours, bleaching occurs also with the field removed and the electrodes open circuited.

Examples 3—12

Table I below illustrates other combinations of persistent electrochromic materials and insulating materials which when supported as films between electrode materials substantially as described in Examples 1 and 2 exhibit the reflected radiation transmission characteristics of the invention.

TABLE I

| Example | Electrochromic material | Insulating material |
| --- | --- | --- |
| 3 | Tungsten oxide | Calcium fluoride. |
| 4 | Molybdenum oxide | Do. |
| 5 | Copper stannate | Do. |
| 6 | Niobium oxide | Silicon oxide. |
| 7 | Vanadium oxide | Do. |
| 8 | Cobalt tungstate | Do. |
| 9 | Copper stannate | Do. |
| 10 | Tungsten oxide | Magnesium fluoride. |
| 11 | Molybdenum oxide | Do. |
| 12 | Copper stannate | Do. |

Other combinations of the materials discussed above may be employed to vary the final characteristics of the overall device i.e., the percentage change in light transmission capability, the voltage required to establish the requisite field strength, the time for the change to occur, etc. The depth of coloration is also dependent upon the thickness of the persistent electrochromic layer. In theory, it would seem that the thicker the layer, the more color centers would be formed upon application of the electric field and therefore deeper coloration could be expected. However, since thin layers could be expected to color more quickly in some cases, the relationship between thickness of the layers and depth of color is not simple.

In FIG. 4, a variation of the device is shown wherein the glass substrate 22, reflecting layer 29, and conductor 24 are replaced by a single reflecting layer 25. In this case it is necessary to use a self-supporting layer and one which is not affected by electric conductivity, for example stainless steel. In this case, the single layer serves as both the conductor and the reflector by connecting the electric current carrier thereto.

Alternatively, the device of FIG. 1 could also be modified by replacing conductor 24 with a conductive, reflective material and omitting layer 29.

The inventive device can be useful in many ways. It can be used as part of an optical system involving reflective elements where close control of light intensity is desired without modifying its other properties. Thus no diaphragms or other separate light modulating elements would be necessary. Moreover, the optics may be simpler since the light rays are not altered except in intensity.

While the device has been illustrated as having a flat reflecting surface, it will be obvious that the reflecting surface may take any desired configuration such as a spherical or parabolic surface, for example.

The device is particularly suitable as a rear view mirror in motor vehicles for night driving. It is possible by the use of the device to reduce the intensity of reflected light from headlights of a following vehicle to a desired degree by merely coloring the electrochromic layer. This can be done by mere switching and is thus quick and effective.

While certain specific embodiments and preferred modes of practice of the invention have been described, this is solely for illustration, and it will be obvious that various changes and modifications may be made without departing from the spirit of the disclosure or the scope of the appended claims.

I claim:

1. A radiation reflecting device having an electric field responsive radiation transmitting characteristic comprising in sandwich layer arrangement, a pair of electrodes, a layer of a persistent electrochromic material of about 0.01 to 100 microns thickness in contact with one of said electrodes, layer of an insulating material of about 0.001 to 1.0 microns thickness in contact with both said electrochromic material and the other of said electrodes, and a layer of reflecting material.

2. The device of claim 1 wherein at least one of said electrodes is substantially transparent.

3. The device of claim 1 wherein said insulating material is silicon monoxide, calcium fluoride or magnesium fluoride and said persistent electrochromic material is a metal stannate, a Group IVB, VB or VIB metal oxide, or a Lanthanide series metal oxide.

4. The device of claim 1 wherein said persistent electrochromic material is tungsten oxide.

5. A variable light transmitting system as in claim 1 comprising a device having a pair of conductive electrodes; a persistent electrochromic material and an insulating material disposed between said electrodes, and a reflective layer on one of said electrodes, and a control means coupled to said electrodes for selectively applying across said electrodes a potential of one polarity; a potential of the opposite polarity; or an effective short circuit.

6. The system of claim 5 wherein at least one of the selectively applied potentials is variable over a given range.

7. The device of claim 1 wherein one of said electrodes is the reflective layer.

UNITED STATES PATENT OFFICE
CERTIFICATE OF CORRECTION

Patent No. 3,578,843                    Dated May 18, 1971

Inventor(s)  George Augustus Castellion

It is certified that error appears in the above-identified patent and that said Letters Patent are hereby corrected as shown below:

Col. 3, line 37, following the word "removed" insert -- upon --.

Col. 3, line 61, following the word "plastics," insert -- plaster, --.

Col. 6, line 68, delete "$10^{15}$" and insert -- $10^{-5}$ --.

Col. 8, line 43 of Claim 1, following the word "electrodes," insert -- a --.

Signed and sealed this 6th day of June 1972.

(SEAL)
Attest:

EDWARD M. FLETCHER, JR.              ROBERT GOTTSCHALK
Attesting Officer                    Commissioner of Patents